J. B. STEARNS.
Improvement in Duplex Telegraph Instruments and Circuits therefor.
No. 132,932.                    Patented Nov. 12, 1872.
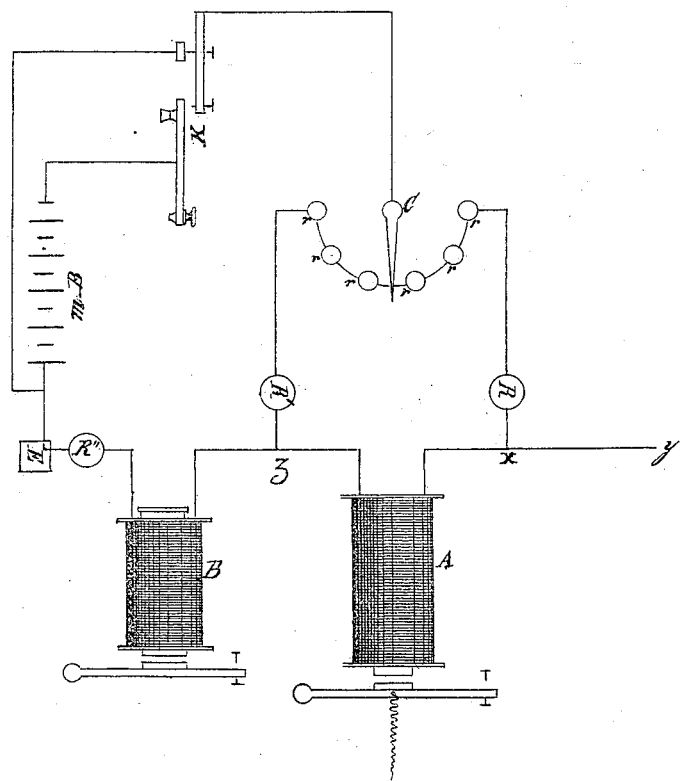
Witnesses
Wm. A. Hayes jr.
Samuel Snow
Inventor
J. B. Stearns.
AM. PHOTO-LITHOGRAPHIC CO. N.Y. (OSBORNE'S PROCESS.)

UNITED STATES PATENT OFFICE.

JOSEPH B. STEARNS, OF BOSTON, MASSACHUSETTS.

IMPROVEMENT IN DUPLEX TELEGRAPH INSTRUMENTS AND CIRCUITS THEREFOR.

Specification forming part of Letters Patent No. 132,932, dated November 12, 1872.

*To all whom it may concern:*

Be it known that I, JOSEPH B. STEARNS, of Boston, in the county of Suffolk and Commonwealth of Massachusetts, have invented an Improvement in Telegraph Apparatus, of which the following is a specification:

This invention relates to an improved apparatus for the simultaneous transmission of two signals from opposite ends of the same line-wire; and consists in the combination and arrangement of the receiving instrument or relay with resistance-coils in such a manner that when a current is transmitted from the home station it passes directly to the line without passing through the receiving instrument at that station, this instrument responding only to the currents transmitted from the distant station, which permits of the use of a chemical-receiving instrument, if desired, in place of the electro-magnetic instrument generally used. This invention also consists in the combination of the receiving instrument with an electro-magnet, which is operated by the signals transmitted from the home-station only, and thus enables the operator to hear the signals which he is transmitting.

The accompanying drawing making a part of this specification represents my apparatus, in which—

A is the receiving instrument; R R', two resistance-coils connected to said instrument A on either side thereof; R'', a resistance-coil or rheostat situated between the receiving instrument and the earth; $r\ r\ r\ r\ r\ r$ small resistance-coils placed between the resistance-coils R R'; B, the additional electro-magnet; C, a swinging arm connecting the battery with the small resistance-coils; K, the lever-key; M B, the main battery; $x\ y$, the line.

The principle upon which my apparatus is constructed and operated is that of the well-known "Wheatstone bridge or balance," which invention is based upon the observed fact that when a current is divided between two parallel circuits, and said circuits are connected by a cross circuit or bridge between the two, no current will pass through the bridge, provided the resistances of the opposite circuits on each side of the bridge are equal or are in the same ratio.

In my apparatus one arm of the balance is formed by the line $x\ y$, the opposite arm by the resistance-coil or rheostat R'', which is placed between the receiving instrument and the earth, as above described. The receiving instrument is placed in the bridge, while the other two arms of the balance are formed, respectively, by two branch circuits, which pass from the key K through a part of the small resistances $r\ r\ r\ r$ and the resistance-coils R R', respectively, to each side of the receiving instrument A. If then the resistance of the line be two thousand units and that of the resistance coil or rheostat R'' one thousand units, the resistance of each of the small coils $r\ r\ r$, &c., ten units, and the resistances of R and R', respectively, be such that when the small resistance-coils are equally divided between R and R' by the swinging-arm C, the resistance on each side is four hundred and two hundred units, respectively, no current will pass through the receiving instrument placed on the bridge when the circuit with the battery is closed, for the reason that the resistances in opposite circuits on each side of the bridge are in the same ratio to each other, that of two to one, and consequently the receiving instrument will be unaffected by the signals transmitted from the station. When, however, a current from the distant station is put on the line it passes through the receiving instrument A in the bridge; for at the point $x$ it finds two paths to pursue, one through the resistance R to the battery or earth, the other through the receiving instrument and the coil R'. If the resistance of the receiving instrument is two hundred units there will be a resistance of four hundred units, one each side of the point $x$, and the current will consequently be equally divided. In long lines of telegraph the resistance is variable, depending upon the amount of moisture in the atmosphere, and is, moreover, liable to be otherwise affected. These changes in the resistance of the line by altering the ratio between the several resistances would cause a current in the bridge were not a means of adjustment provided by which the ratio can be maintained constant. This adjustment may be effected either by using an adjustable rheostat for the resistance at R'', or by the small coils $r\ r\ r$, &c., before referred to, which are arranged in an arc between the resistances R and R', and are connected to the battery by a swinging arm.

The following example will illustrate the use of these coils: We have assumed the resistance of the line to be two thousand units, and that of the resistance-coil R'' to be one thousand units, or in the ratio of two to one. If, then, from any cause the resistance of the line be diminished, as, for example, to one thousand seven hundred and twenty-seven units, the ratio, with the resistance R'', will be changed from two to one to that of thirty-eight and twenty-two, and, consequently, in order to prevent a current in the bridge the ratio between the coils R and R' must be correspondingly changed. This is accomplished by moving the swinging arm C until two small resistances, $r\ r$, or twenty units are taken from the resistance R and added to the resistance R', so that the resistance on either side of the arm is changed from four hundred and two hundred to three hundred and eighty and two hundred and twenty units, respectively.

The values of the several resistances are arbitrarily assumed for the purpose of illustration; in constructing the apparatus other values may be given, provided the proper ratios are maintained.

For the purpose of enabling the operator at the station to hear his own signals, I place an electro-magnet, B, between the resistance R'' and the receiving instrument, and when the circuit with the battery is closed a current passes through this magnet and it responds to the signal. The magnet B may operate a sounder-magnet by means of a local circuit. The resistance of this magnet is included with the resistance of R'' in the foregoing.

In this form of double transmitting apparatus the current from the home-station never passes through the receiving instrument, and consequently in place of a magnetic a chemical-receiving instrument, in which the signals are recorded by the decomposition of a strip of chemically-prepared paper, may be used.

What I claim as my invention, and desire to secure by Letters Patent of the United States, is—

1. The combination of the receiving instrument with the resistance-coils R R' R'', in the manner and for the purpose set forth.

2. The combination of the receiving instrument, and the resistance-coils R R' R'' with a series of small resistances $r\ r\ r\ r\ r$, as and for the purpose set forth.

3. The combination of the receiving instrument A with the electro-magnet B, as and for the purpose set forth.

J. B. STEARNS.

Witnesses:
WM. A. HAYES, Jr.,
SAMUEL SNOW.